United States Patent [19]

Heikinheimo

[11] 4,231,460
[45] Nov. 4, 1980

[54] SYSTEM FOR TRANSFERRING WANE-EDGED BOARDS

[75] Inventor: Olli Heikinheimo, Helsinki, Finland

[73] Assignee: Plan-Sell Oy, Helsinki, Finland

[21] Appl. No.: 952,464

[22] Filed: Oct. 18, 1978

[51] Int. Cl.³ .............................................. B65G 43/08
[52] U.S. Cl. ...................................... 198/341; 83/367; 144/312; 198/345; 198/456
[58] Field of Search ............... 198/345, 341, 434, 456, 198/, 502, 572; 144/312; 83/367

[56] References Cited

U.S. PATENT DOCUMENTS

| | | | |
|---|---|---|---|
| 3,565,140 | 2/1971 | Jacobsen | 144/312 |
| 3,638,792 | 2/1972 | Bilocq | 198/456 X |
| 3,756,297 | 9/1973 | Heikinheimo | 144/312 |
| 3,983,403 | 9/1976 | Dahlström et al. | 250/561 X |
| 4,086,496 | 4/1978 | Berry | 250/561 |

FOREIGN PATENT DOCUMENTS 395870 8/1977 Sweden .

*Primary Examiner*—James L. Rowland
*Attorney, Agent, or Firm*—J. Harold Nissen

[57] ABSTRACT

System of transferring wane-edged boards through a control station for edging to detect the wane consistent and possibly other characteristics of the board automatically. The board is first aligned automatically by transporting each board separately and sequentially against a first group of fixed transversal stops to provide the same sawing line for each sequentially fed board; then each is moved sequentially from the transversal stops to and through a control station where the wane consistent and other features may be detected. The information is recorded in a data processing unit memory, and then the board is transferred to an edging station and aligned against a second group of transversely positioned adjustable stops. The movable stops are optimized on the basis of information supplied by the data processing unit based on quantities measured at the control station and other information so that each of the boards is transferred to the same sawing line. The aligned board is then charged into an edging machine along a sawing line which is predetermined at the control station.

7 Claims, 1 Drawing Figure

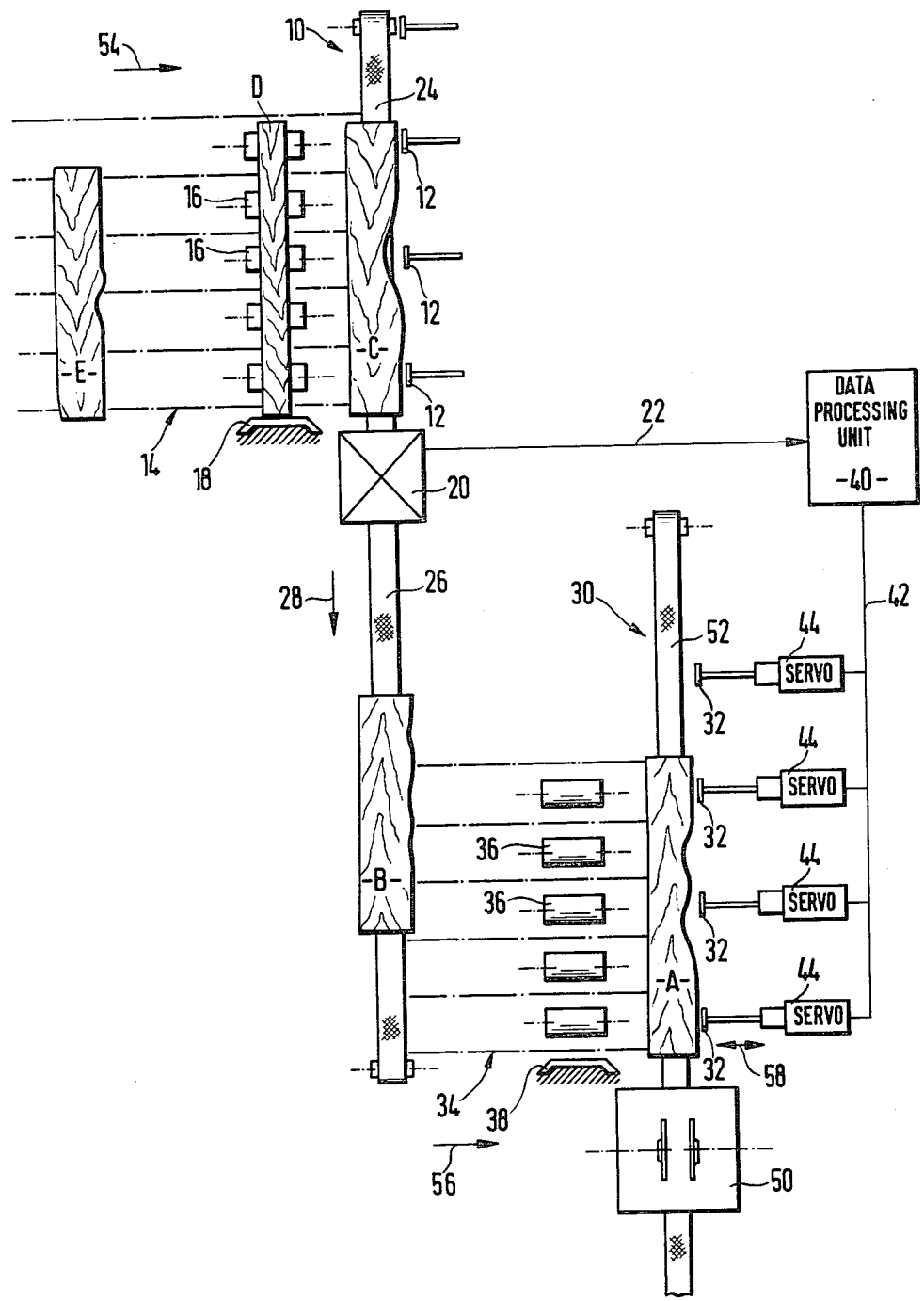

SYSTEM FOR TRANSFERRING WANE-EDGED BOARDS

SYSTEM FOR TRANSFERRING WANE-EDGED BOARDS

The invention is concerned with a system for transferring wane-edged boards through a control station before edging thereof in an edging machine.

BACKGROUND OF THE INVENTION

The transferring of boards automatically through a control station before edging is already known in the prior art. As an example of such an arrangement, reference is made to an apparatus disclosed in Swedish patent publication No. 395,870. According to the disclosure of the aforesaid patent publication, every board is transferred in a transversal direction to a measuring station; the board is then arrested against stops and the board lays still during the optical measuring of wane consistent. After obtaining the measuring information, the stops are moved away so that the board can be further transported in a longitudinal position against alignment stops. In alignment stops have been positioned according to information provided by a data processing unit in order to achieve an optimum result in the edging of the board. From alignment stops the board is charged into the edging station while at the same time the exact or desired edging is maintained in accordance with the information provided from the data processing unit.

Some problems exist in connection with the prior art system, and these specifically are that the prior known systems either do not measure the wane consistent as rapidly as desired or as accurately as desired.

The defect of the previously known automatic wane consistent measurements is either their inaccuracy or their slowness. With the solution proposed by the aforementioned Swedish patent publication, the board's transversal movement is stopped for a period of time which is necessary to make the measurement. Furthermore, stopping and again accelerating the board requires its own additional time. It is also to be noted that while the board is fed out of the alignment station in the longitudinal direction, the next board is only able to enter the measurement station when the previous board has been moved to a distance away, equal to its own length.

It is therefore an object of the present invention to provide a system in which the measurement of the wane-edge consistent as well as other features of the board lumber are automatically detected while the board moves longitudinally through the control station.

A further object of the invention is to speed up the measurement and alignment processes and system of wane-edged boards.

Yet another object of the invention is to provide a system in which one board is being checked while another board is being aligned so that both the alignment of a following board takes place while a lead board is being checked.

Still another object of the invention is to move a board into justaposition with fixed stops to fix the orientation and form of the board into orthogonal coordinates to continuously move boards through a wane edge saw without stopping to ascertain the coordinates.

SUMMARY OF THE INVENTION

According to the invention, a method and system is provided in which wane-edged boards are transferred through a control station before edging thereof. Each board is transferred separately to the control station so that the wane consistent and possibly other features of the board can be automatically detected, and subsequent thereto the board can be automatically aligned in accordance with the features and characteristics obtained from the control station so as to obtain an optimum result in the edging of the board.

In accordance with the teachings of the invention, a first board is aligned with an alignment station prior to being fed into the control station to obtain the wane-edge information, and while the first board is being fed into the control station, a second following board can be fed to the alignment station for alignment thereof prior to being fed to the control station. Subsequent to obtaining the information from the first board at the control station, the first board can be fed to an edging station in which the information obtained from the control station can be used to position the board in the edging station for proper cutting. At this time, the second board can be fed to the control station, and a third board will then be fed to the alignment station. This process of feeding the three boards sequentially takes place without the necessity of stopping the system and the movement or the acceleration of the board in the longitudinal direction at each of the stages will take place in a continuous and tranquil manner.

The single FIGURE of the drawing illustrates the method and system of the invention.

DESCRIPTION OF THE PREFERRED EMBODIMENTS

Referring to the single FIGURE of the drawing, the system for transferring wane-edged boards through a control station includes an alignment station 10, a control station 20, an edging station 30, a data processing unit 40 coupled with control station 20 and edging station 30, and an edger saw 50.

Alignment station 10 includes a plurality of fixed transversal stops 12 aligned with control station 20, and an infeed conveyor system to the control station 20 comprising an intermediate transfer conveyor 14 for conveying boards both longitudinally and transversely. Intermediate transfer conveyor 14 includes a conveyor system for conveying the boards longitudinally towards fixed transversal stops 12 and a longitudinal conveyor including rollers 16 for moving the boards longitudinally towards a backstop 18.

Edging station 30 includes a plurality of adjustable transversal stops 32, an intermediate transfer conveyor 34, rollers 36 and a backstop 38, in a manner similar to the alignment station 10 for conveying a board both transversely and longitudinally towards the adjustable transversal stops 32.

Control unit 20 includes an output 22 which is applied to the data processing unit 40 for feeding into the data processing unit information concerning the wane-edge consistent, and the data processing unit 40 includes an output 42 which is applied to servo units 44 to control the adjustable position of adjustable transversal stops 32. Each adjustable transversal stop 32 is provided with its own servo unit 44 which is responsive to the information received from the data processing unit 40 to position the adjustable stops 32.

In the single FIGURE of the drawing, five different boards A, B, C, D and E are shown to demonstrate the different positions of the boards. Board C is in position adjacent to fixed stops 12 having been conveyed thereto by intermediate transfer conveyor 14, and an infeed conveyor 24 moves the board C through the control station 20 at which time information is derived therefrom for application to the data processing unit 40, and then when the board moves out from the control station 20 it is in the position of board B and has been moved out by means of outfeed conveyor 26. After board B is moved out of control unit 20 by the outfeed conveyor 26 it is picked up by the intermediate transfer conveyor 34 for movement to the adjustable stops 32. After proper positioning at the adjustable stops 32, the board is moved by means of a saw conveyor 52 to edger saw 50.

While the drawing shows various of the conveyors and other elements in a schematic form, it will be understood that conventional units are available for these. For example, certain parts have also been omitted for the sake of clarity, and the system in accordance with the invention is adapted to receive the boards after they have gone through a preliminary sawing process, and the drawing does not include this saw which can be either a gang saw or a band saw.

After the sawing process, the boards are transported to the first intermediate transfer conveyor 14. The first intermediate transfer conveyor forms a temporary stock where any possible minor scrambles present at the sawing process are eliminated. The intermediate transfer conveyor 14 also includes the rollers or roller set 16 for conveying lumber longitudinally. The purpose of the roller set is to transfer one end of each board to the same level against the back stop 18. Thereafter, each board is transversally moved against the transversal stops 12. If the apparatus has several stops 12, it also comprises a system which chooses the two most suitable stops for each board and the board is stopped against them.

The board C, as shown in the drawing, which has been using the stationary stops 12, is charged through the control device 20. The control device 20 comprises equipment for detecting, among other things, the wane edge. The readings given by the control device are transferred to the data processing unit 40 from output 22 which is used as the information input into data processing unit 40. From the control station 20, the board is then transferred from the outfeed conveyor 26 to the intermediate transfer conveyor 34. At the same time, this forms a flexible temporary stock between the control station 20 and the edger saw 50. The intermediate transfer conveyor 34 also includes devices such as rollers 36 for moving boards longitudinally against the stationary stop 38. The roller set or rollers 36 are here also best used for the transversal conveyor.

Each board is moved from the intermediate transfer conveyor 34 against the adjustable stops 32. The adjustable stops 32 are situated in the longitudinal direction of the board at places exactly corresponding to those of the stops 12. It is principally for this reason, that the front ends of the boards are transferred to the same line with the intermediate transfer conveyors 14 and 34. The position of the adjustable stops is defined by the data processing unit 40, which optimizes in a desired manner both the optimum lumber width and the optimum position and direction of the board. In positioning the stops 32, the data processing unit takes into account other qunatities in addition to the wane consistent information, such as the market prices, amount of stocked lumber, etc. Simultaneously, the data processing unit 40 also controls the functioning of the edger saw 50 so that it is always suitably positioned with respect to the individual boards.

The transferring of the boards sideways against the stops 12 and 32 can also be carried out in such a manner that the boards are moved to vertically moving props or to an inclined hauling runway, which transfers the boards one by one first to the alignment station and further to the infeed conveyor 24. It is desirable that the infeed conveyor be a band conveyor and that the maintenance of the boards in an exactly correct position on the conveyor be ascertained by using reduced pressure between the board and the band.

The bands are moved by the intermediate transfer conveyor 14 in the direction of arrow 54 to abut the fixed transversal stops 12, and after the board leaves the control station 20, they are moved by the outfeed conveyor 26 in direction of arrow 28 to the outfeed intermediate transfer conveyor 34 and moved thereby in the direction of arrow 56 towards the adjustable transversal stops 32. the stops 32 are transversely movable in the direction of doubleheaded arrow 58 to align themselves in response to transverse movement by servos 44 based on the information from the data processing unit 40. The stops 32 are longitudinally aligned relative to each other in the same longitudinal arrangement as fixed stops 12.

In operation of the system, the boards are continuously moved through the control station 20 rather than continually. Accordingly, board A starts at the position of the board marked E in the drawing, and each individual board continuously moves through all of the positions from E to A. At position D, the board is shown as being moved into abutment with fixed back stop 18, and in a similar manner, rollers 36 move the board into abutment with fixed stop 38. In the position C, the board is moved by the infeed conveyor 24 through the control station to the outfeed conveyor 26 at position A by means of intermediate transfer conveyor 34 and rollers 36.

What is important is that the measurement of lumber takes place while the board continuously moves longitudinally through the control station, and that the board is aligned with the transversal stops.

While there has been shown what is considered to be the preferred embodiment various changes and modifications may be made therein without departing from the scope of the invention.

I claim:
1. A system for continuously transferring wane-edged boards through a control station prior to edging to measure the wane edge for a controlled positioning of the board prior to the continuous sequential edging thereof in an edge saw mechanism, comprising:
   first conveyor means to continuously align while supplying a plurality of boards sequentially both longitudinally and transversely prior to feeding of the board through the control station to provide an output indicative of the orientation of each board,
   data processing means coupled with said control station and responsive to information output thereof to store information characteristic of the wane consistent of the boards and the orientation thereof, and
   second conveyor means adapted separately to receive the boards from the control station to align the boards in sequence transversely and longitudinally for continously feeding thereof to said edge saw mechanism, said second conveyor means including adjustable positioning means responsive to the output of said data processing means for controlling the optimum alignment of the boards prior to the feeding thereof to said edge saw mechanism.

2. The system as claimed in claim 1 wherein each said conveyor means comprises:
stops adapted for aligning a longitudinal and a transverse edge of the board to fix the orientation of the board into orthogonal coordinates.

3. The system as claimed in claim 1 or 2, wherein each said conveyor means comprises:
a plurality of aligned stops for aligning a longitudinal edge of the board, at least two of said stops being in contact with the board edge when fed into the next station,
an intermediate transfer conveyor for moving the board in a transverse direction toward said plurality of aligned stops to have the longitudinal edge engage at least two of said stops,
a back stop, and
a plurality of rollers to move the board in a longitudinal direction towards said back stop while said intermediate transfer conveyor moves the board toward said plurality of stops, so as to align each board transversely and longitudinally.

4. The system as claimed in claim 3, wherein said plurality of stops of said first conveyor means are fixed, and said plurality of stops of said second conveyor means are adjustable and are operatively associated with said data processing means for positioning each of the boards in accordance with information obtained about the wane-edge thereof from said control station, said first conveyor means includes an infeed conveyor to said control station, and said second conveyor means includes an outfeed conveyor from said control station for feeding of each board sequentially and continuously through said control station.

5. The system as claimed in claim 3, wherein the plurality of stops of said second conveyor means are adjustable in the transversal direction, and said plurality of adjustable stops are coupled with said control station for adjustment responsive to wane-edge information concerning the individual board being aligned by said adjustable stops.

6. The system as claimed in claim 1, wherein each said conveyor means includes means to move the boards both transversely and longitudinally for alignment thereof in the transversal and longitudinal directions, and longitudinal feed means associated with said control unit for feeding the boards continuously through said control unit.

7. The system as claimed in claim 6, wherein said longitudinal feed means of said first conveyor means is an infeed conveyor adapted to feed aligned boards to said control unit, and said longitudinal feed means of said second conveyor means is an outfeed conveyor adapted to move boards to the transversely and longitudinal moving means of said second conveyor means.

* * * * *